(12) United States Patent
Wuttke et al.

(10) Patent No.: US 8,712,642 B2
(45) Date of Patent: Apr. 29, 2014

(54) METHOD FOR PARKING OR EXITING A PARKING BAY AND FOR AVOIDING A COLLISION OF A VEHICLE, AND CORRESPONDING ASSISTANCE SYSTEMS AND VEHICLE

(75) Inventors: Ulrich Wuttke, Braunschweig (DE);
Philipp Hueger, Wolfsburg (DE);
Mehmet Terkes, Braunschweig (DE);
Stefan Bruening, Berlin (DE)

(73) Assignee: Volkswagen AG, Wolfsburg (DE)

( * ) Notice: Subject to any disclaimer, the term of this patent is extended or adjusted under 35 U.S.C. 154(b) by 183 days.

(21) Appl. No.: 13/100,108

(22) Filed: May 3, 2011

(65) Prior Publication Data

US 2011/0301814 A1    Dec. 8, 2011

(30) Foreign Application Priority Data

May 12, 2010   (DE) .......................... 10 2010 020 203

(51) Int. Cl.
*B62D 6/00* (2006.01)
*G08G 1/16* (2006.01)

(52) U.S. Cl.
USPC ............................................. 701/41; 701/36

(58) Field of Classification Search
None
See application file for complete search history.

(56) References Cited

U.S. PATENT DOCUMENTS

| | | | | |
|---|---|---|---|---|
| 4,373,619 A * | 2/1983 | Schritt et al. | .................... | 477/61 |
| 4,458,446 A * | 7/1984 | Mochida et al. | .................. | 49/28 |
| 4,541,721 A * | 9/1985 | Dewar | .......................... | 356/623 |
| 4,862,640 A * | 9/1989 | Boyko et al. | .................... | 49/213 |
| 4,988,260 A * | 1/1991 | Kiba et al. | .................. | 414/744.1 |
| 5,065,325 A * | 11/1991 | Takahashi | ....................... | 701/43 |
| 5,134,350 A * | 7/1992 | Mahoney | ...................... | 318/466 |
| 5,414,627 A * | 5/1995 | Wada et al. | ..................... | 701/41 |
| 5,563,790 A * | 10/1996 | Wada et al. | ..................... | 701/41 |
| 5,833,301 A * | 11/1998 | Watanabe et al. | ............. | 296/155 |
| 6,097,314 A * | 8/2000 | Desens et al. | ............. | 340/932.2 |
| 6,644,433 B2 * | 11/2003 | Sato | ............................. | 180/446 |
| 6,933,837 B2 * | 8/2005 | Gunderson et al. | ........... | 340/436 |
| 7,155,325 B2 * | 12/2006 | Tanaka et al. | .................. | 701/36 |
| 7,457,437 B2 * | 11/2008 | Ertl et al. | ...................... | 382/104 |
| 2002/0039136 A1 * | 4/2002 | Okamoto et al. | ............. | 348/148 |

(Continued)

FOREIGN PATENT DOCUMENTS

| | | |
|---|---|---|
| DE | 102005017359 | 11/2005 |
| DE | 102007049709 A1 | 4/2009 |
| DE | 102008022971 A1 | 11/2009 |
| EP | 2081167 A2 | 7/2009 |

OTHER PUBLICATIONS

Search Report for European Patent Application No. 11002666.3; Jul. 28, 2011.

(Continued)

*Primary Examiner* — Fadey Jabr
*Assistant Examiner* — Krishnan Ramesh
(74) *Attorney, Agent, or Firm* — Barnes & Thornburg LLP

(57) ABSTRACT

An obscured state of a vehicle, in which a distance measuring sensor of an assistance system is obscured by a part of the vehicle, is automatically detected. If the obscured state is present, a steering intervention of the assistance system into a steering system of the vehicle during a parking or parking-bay-exiting process of the vehicle using the assistance system is automatically deactivated or prevented. Furthermore, to avoid a collision of the vehicle using the assistance system, a notification of an obscured state is automatically generated when the obscured state is present.

14 Claims, 1 Drawing Sheet

(56) References Cited

U.S. PATENT DOCUMENTS

Figure 2:
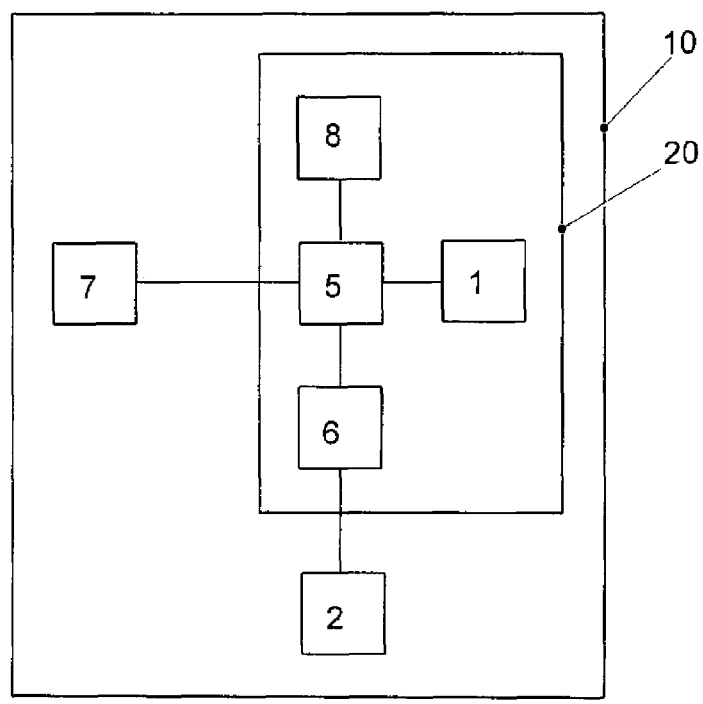

| | | | |
|---|---|---|---|
| 2002/0056585 A1* | 5/2002 | Jones et al. | 180/286 |
| 2004/0257244 A1* | 12/2004 | Kubota et al. | 340/932.2 |
| 2004/0257556 A1* | 12/2004 | Samukawa et al. | 356/4.01 |
| 2005/0099273 A1* | 5/2005 | Shimomura et al. | 340/426.1 |
| 2005/0264099 A1* | 12/2005 | Kamiya et al. | 303/15 |
| 2005/0270177 A1* | 12/2005 | Mori et al. | 340/932.2 |
| 2009/0243912 A1* | 10/2009 | Lohmeier et al. | 342/70 |
| 2010/0070138 A1* | 3/2010 | Schoening et al. | 701/42 |
| 2011/0301814 A1* | 12/2011 | Wuttke et al. | 701/41 |

OTHER PUBLICATIONS

Search Report for German Patent Application No. 10 2010 020 203.7; Aug. 19, 2013.

* cited by examiner

METHOD FOR PARKING OR EXITING A PARKING BAY AND FOR AVOIDING A COLLISION OF A VEHICLE, AND CORRESPONDING ASSISTANCE SYSTEMS AND VEHICLE

The present invention relates firstly to a method for parking a vehicle or driving the vehicle out of a parking bay by means of an assistance system, and secondly to a method for avoiding a collision of a vehicle by means of an assistance system. The present invention also relates to correspondingly designed assistance systems and vehicles.

DE 10 2005 017 359 A1 describes an assistance system of a vehicle, in which system-relevant functions are checked before an intervention into the steering system of the vehicle is carried out.

While it has been observed that the prior art takes fault in system-relevant functions into consideration, and the prior art only takes this system-relevant function into consideration, it is the object of the present invention to also take into consideration normal operating states of the vehicle which adversely affect a mode of operation of an assistance system by means of which a parking process of a vehicle can be assisted or a collision of the vehicle can be avoided.

Within the context of the present invention, a method for parking a vehicle or driving a vehicle out of a parking bay using an assistance system is provided. Here, a certain state of the vehicle, referred to here as the obscured state, is automatically detected. Said obscured state is present when a distance measuring sensor, for example an ultrasound sensor, of the assistance system is obscured by a part of the vehicle, for example a sliding door of the vehicle. When the obscured state is present, if a steering intervention of the assistance system into a steering system of the vehicle is active, said steering intervention is automatically deactivated, or if the steering intervention is not activated, an activation of the steering intervention is automatically prevented.

The present invention prevents a (semi-)automatic parking or parking-bay-exiting process being carried out when one or more distance sensors are obscured for example by a sliding door of the vehicle. In other words, a (semi-)automatic parking or parking-bay-exiting process can advantageously be carried out only when all the distance measuring sensors have a clear view of obstacles in the environment of the vehicle, as a result of which a collision-free parking or parking-bay-exiting process is ensured.

In particular, the steering intervention of the assistance system is deactivated or prevented only if the obscured distance measuring sensor lies, in the case of a curb-side parking bay, on that side of the vehicle on which the curb-side parking bay is also situated as viewed from the vehicle.

It is however nevertheless possible according to the invention for a measurement of a parking bay to be carried out by means of the non-obscured distance measuring sensors even if one or more distance measuring sensors are obscured, that is to say the obscured state is present.

Since the measurement of a parking bay can be carried out even with only some of the distance measuring sensors (for example, the parking bay can be measured by means of front sensors while the rear sensors are obscured by a sliding door), it is advantageous to make the measurement of a parking bay possible even in the obscured state.

If it is detected that the obscured state of the vehicle is no longer present, for example because the sliding door is closed, the information regarding a parking bay gathered in the obscured state can be used to automatically carry out a parking process by means of the assistance system.

In other words, the parking bay need not be re-measured when the distance measuring sensor which is obscured by the vehicle part (for example the sliding door) in the obscured state) is exposed again.

In other words, the obscured state during a parking process leads to the parking process being influenced only if the steering intervention is present (because the latter is deactivated in the obscured state) or if a so-called OK position (position of the vehicle from which the vehicle is parked into the parking bay by reversing), because the activation of the assistance system for (semi-)automatic parking is not offered in the obscured state.

If the steering intervention of the assistance system is automatically deactivated during a parking process because the obscured state is detected, said parking process may under certain circumstances be continued if the obscured state of the vehicle is no longer present (for example because the sliding door is closed again) and the assistance system is manually activated to continue the parking process.

For example, if the sliding door is opened during an automatic parking process, the steering intervention by the assistance system is deactivated and therefore the parking process is interrupted, as described above. If, for example, the driver identifies this and thereupon closes the sliding door, the parking process can advantageously be continued when the assistance system is manually activated (by the driver).

A resumption of the parking process is however only possible, in the case of parking, if the method according to the invention is in a first maneuvering step of the parking process.

Also provided within the context of the present invention is a further method for avoiding a collision of a vehicle by means of an assistance system. Similarly to the method according to the invention described above, an obscured state of the vehicle is automatically detected, wherein in the presence of said obscured state, at least one distance measuring sensor of the assistance system is obscured by a part of the vehicle. If said obscured state is present, a notification of the present obscured state is generated.

As a result of said notification, which may be provided visually in the form of a display, audibly by means of the output of a certain tone sequence or haptically, for example by vibrating the steering wheel, the driver of the vehicle is advantageously informed that the collision protection of the vehicle is present only to a restricted extent for example on account of an open sliding door. The driver may react to this by either closing the sliding door or at least driving more cautiously on the basis of the knowledge of said restriction.

The flank protection or collision protection is deactivated (that is to say muted) in particular for that edge region which is monitored by the obscured distance measuring sensor. Here, the function of the obscured distance measuring sensor is also deactivated with regard to a detection of new objects or an updating of objects already detected.

Here, the notification comprises in particular an item of information which informs the driver as to which edge region of the vehicle is monitored only to a restricted extent on account of the obscured distance measuring sensor.

Within the context of the present invention, an assistance system for a vehicle is also provided. Here, the assistance system comprises a controller, a plurality of distance measuring sensors (for example ultrasound sensors) for measuring an environment of the vehicle, and a state detecting sensor. By means of the state detecting sensor, an obscured state of the vehicle is detected in which one or more of the distance measuring sensors are obscured by a part of the vehicle. The controller deactivates a steering intervention of the assistance system into a steering system of the vehicle if the steering intervention is active, or prevents an activation of said steering intervention if the steering intervention has not been activated, if the controller detects the obscured state by means of the state detecting sensor.

Also provided within the context of the present invention is a further assistance system for a vehicle. The further assistance system comprises a device for generating a notification, a controller, a plurality of distance measuring sensors and a state detecting sensor. Similarly to the assistance system according to the invention described above, the further assistance system detects the obscured state by means of the state detecting sensor, which obscured state is present if one or more of the distance measuring sensors are obscured by a part of the vehicle. The controller generates the notification of the obscured state by means of the device if the controller detects the obscured state by means of the state detecting sensor.

The advantages of the assistance systems according to the invention substantially correspond to the advantages of the method according to the invention described above in detail, such that a repetition will be omitted here.

Here, as a distance measuring sensor, use may be made not only of an ultrasound sensor but also of an optical sensor, an infra-red sensor or also a camera. A combination of sensors of different types is also conceivable.

Finally, within the context of the present invention, a vehicle is provided which comprises the assistance system according to the invention and/or the further assistance system according to the invention.

The present invention is suitable in particular for a vehicle which is configured with an assistance system and in which an entirely normal operating state of the vehicle leads to a restriction of the mode of operation of the assistance system. The present invention is self-evidently not restricted to said preferred field of application, since the present invention can also be used in aircraft, ships and rail-guided or track-guided vehicles.

The invention will be explained in detail below on the basis of preferred embodiments and with reference to the figures.

Figure 1:
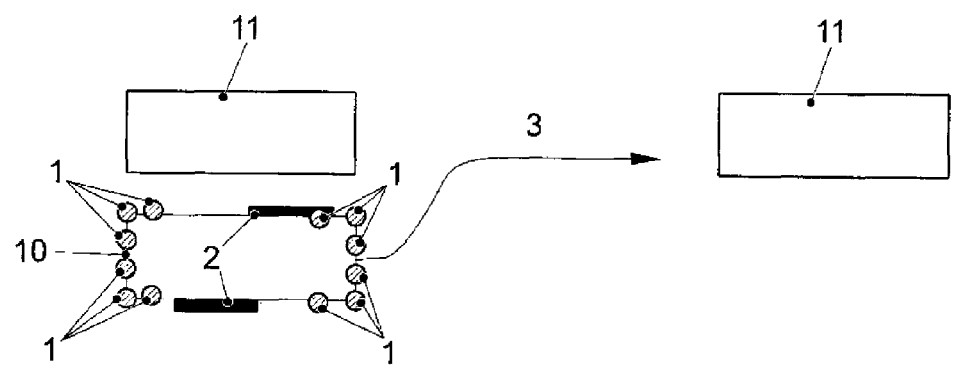

FIG. 1 illustrates a parking process according to the present invention.

FIG. 2 schematically illustrates a vehicle according to the invention having an assistance system according to the invention.

FIG. 1 illustrates a vehicle 10 according to the invention during a parking process. The vehicle 10 comprises a plurality of ultrasound sensors 1 and, on each side, in each case one sliding door 2. Since the right-hand sliding door 2 is open, said sliding door 2 obscures the rear ultrasound sensor 1 on the right-hand side of the vehicle 10, as a result of which a so-called obscured state of the vehicle 10 is present. Even if said ultrasound sensor 1 is obscured, a parking bay 3 situated between the two parked vehicles 11 on the right-hand side of the vehicle 10 can be measured by the remaining ultrasound sensors 1, in particular by the front ultrasound sensor 1 on the right-hand side, as the vehicle 10 travels past.

On account of the ultrasound sensor 1 obscured by the open sliding door 2, the parking process cannot be carried out (semi-)automatically. In contrast, a (semi-)automatically executed parking process in the case of a parking bay on the left-hand side of the vehicle 10 would be possible because none of the ultrasound sensors 1 are obscured by the sliding door 2 on said left-hand side.

If the sliding door 2 on the right-hand side of the vehicle 10 is closed, the parking process into the parking bay situated on the right-hand side can be carried out (semi-)automatically after a manual actuation of a control element of an assistance system of the vehicle 10, with information gathered while travelling past the parking bay 3 with the sliding door 2 open being used. In other words, it is not necessary to travel past the parking bay 3 again with the sliding door 2 closed in order to measure the parking bay 3.

If the sliding door 2 on the right-hand side is open during the (semi-)automatic parking process, with the ultrasound sensors 1 on the rear right-hand side of the vehicle 10 being obscured, the steering intervention of the assistance system into the steering system of the vehicle 10 is deactivated, as a result of which the (semi-)automatic parking process is, in effect, interrupted. Said interruption or deactivation may be indicated by means of a corresponding message on the on-board computer of the vehicle 10. If the sliding door 2 is subsequently closed again, the (semi-)automatic parking process can again be continued after the manual actuation of the control element of the assistance system. Said continuation or resumption is however possible only if the vehicle 10 is in a first maneuvering step of the parking process, that is to say no gear change from the reverse gear into the forward gear of the vehicle 10 has yet taken place.

If the gear is changed (that is to say from the reverse gear into the forward gear) when the sliding door 2 on the right-hand side of the vehicle 10 is open and therefore the steering intervention of the assistance system is deactivated, before the sliding door 2 is closed again, the (semi-)automatic parking process cannot be continued. In this situation, only a (semi-)automatic parking-bay-exiting process can be carried out by means of the assistance system.

If one of the two sliding doors 2 is open, as a result of which the corresponding ultrasound sensor 1 is obscured, this is indicated via a display of the vehicle 10. The corresponding edge region of the vehicle 10, in which the corresponding ultrasound sensor 1 is obscured by the open sliding door 2, is then not depicted on said display. When the corresponding sliding door 2 is closed again, the complete edge region of the vehicle 10 (that is to say both sides) is depicted again on the display, thereby indicating to the driver of the vehicle 10 that the collision protection or flank protection of the vehicle 10 is not adversely affected by an obscured ultrasound sensor 1 on either side. When the previously open sliding door 2 is closed again, the flank protection is reactivated for the edge region of the previously covered ultrasound sensor 1 with the values stored before the opening of the sliding door 2.

FIG. 2 schematically illustrates a vehicle 10 according to the invention which comprises an assistance system 20 according to the invention, a steering system 7 and a sliding door 2. Here, the assistance system 20 in turn comprises a controller 5, a (more precisely a plurality of) ultrasound sensor(s) 1, a sensor 6 and an on-board computer 8. By means of the sensor 6, the controller 5 detects whether the sliding door 2 is open and thus obscures one of the ultrasound sensors 1. The controller 5 activates or deactivates a steering intervention of the assistance system 20 into the steering system 7 of the vehicle 10 depending on whether or not the sensor 6 signals that an ultrasound sensor 1 is obscured by the sliding door 2. Furthermore, the fact that an ultrasound sensor 1 is obscured by the sliding door 2 is indicated by means of the on-board computer 8.

The invention claimed is:

1. A method for assisting parking a vehicle or assisting driving the vehicle out of a parking bay using a parking assistance system, wherein the vehicle includes both a parking assistance system and a steering system, the method comprising:

detecting an obscured state of a vehicle sensor, in which at least one distance measuring sensor of the assistance system is obscured by a part of the vehicle, in response to a determination that the vehicle is being parked or driven out of a parking bay;

deactivating, or preventing from activating, by a controller, a steering intervention of the parking assistance system into the steering system in response to detection of the vehicle sensor obscured state, wherein the vehicle sensor obscured state of the at least one distance measuring sensor indicates that the at least one distance measuring sensor is unable to measure distance because the sensor is obscured by a part of the vehicle, enabling distance measurement of the parking bay using at least one non-obscured distance measuring sensor of the parking assistance system even if one or more distance measuring sensors included on the vehicle are in a vehicle sensor obscured state;

reactivating, by the controller, once the vehicle sensor obscured state is no longer detected, the steering intervention of the parking assistant system; and utilizing, by the controller, at least in part, when the steering intervention of the parking assistant system is reactivated, the distance measurement of the parking bay gathered while the vehicle sensor obscured state was detected.

2. The method of claim 1, further comprising detecting if the obscured state of the vehicle is no longer present, the automated parking process is carried out using the parking assistance system and taking into consideration an item of information regarding a parking bay detected when the vehicle sensor was in the obscured state.

3. The method of claim 1, further comprising, subsequent to deactivation of the steering intervention during a parking process or a parking-bay-exiting process of the parking assistance system, reactivating the steering intervention in response to a manual actuation to continue the parking process or the parking-bay-exiting process if it is detected that the vehicle sensor obscured state is no longer present.

4. The method of claim 3, wherein the steering intervention is reactivated only if the parking assistance system is in a first maneuvering operation of a parking or exiting of the parking bay process.

5. A method for avoiding a collision of a vehicle using an assistance system, wherein the vehicle includes both a parking assistance system and a steering system, the method comprising:

detecting an obscured state of a vehicle sensor, in which at least one distance measuring sensor of the parking assistance system is obscured by a part of the vehicle, wherein the vehicle sensor obscured state of the at least one distance measuring sensor indicates that the at least one distance measuring sensor is unable to measure distance because the sensor is obscured by a part of the vehicle;

generating, by a controller, a notification of the vehicle sensor obscured state in response to detection of the vehicle sensor obscured state; and enabling distance measurement of a parking bay using at least one non-obscured distance measuring sensor of the parking assistance system even if one or more distance measuring sensors included on the vehicle are in a vehicle sensor obscured state;

utilizing, at least in part, the distance measurement of the parking bay gathered while the vehicle sensor obscured state was detected, once the vehicle sensor obscured state is no longer detected.

6. The method of claim 5, wherein the notification comprises information indicating that collision protection provided by the parking assistance system is provided only to a restricted extent because the distance measuring sensor is obscured.

7. A parking assistance system for a vehicle, the vehicle also including a steering system, the parking assistance system comprising:

a controller;

a plurality of distance measuring sensors that measure distances within an environment in which the vehicle is located; and at least one state detecting sensor being designed to detect an obscured state of a vehicle sensor in which one of the distance measuring sensors is obscured by a part of the vehicle, wherein the controller detects the vehicle sensor obscured state using the at least one state detecting sensor, and wherein the controller deactivates a parking assistance system, thereby preventing a steering intervention of a steering system if the steering intervention is active, or does not activate the steering intervention if the steering intervention is not active, wherein distance measurement of a parking bay is enabled using at least one non-obscured distance measuring sensor of the parking assistance system even if one or more distance measuring sensors included on a vehicle are in a vehicle sensor obscured state;

wherein the controller reactivates the steering intervention of the parking assistance system once the vehicle sensor obscured state is no longer detected; and wherein the controller, when the steering intervention of the parking assistant system is reactivated, utilizes, at least in part, the distance measurement of the parking bay gathered while the vehicle sensor obscured state was detected.

8. The parking assistance system of claim 7, wherein the parking assistance system performs a process for parking the vehicle or driving the vehicle out of a parking bay and deactivates or prevents from activating a parking assistance system, thereby preventing a steering intervention of the steering system in response to detection of the vehicle sensor obscured state.

9. A parking assistance system for a vehicle, the assistance system comprising;

a device that generates a notification;

a controller;

a plurality of distance measuring sensors; and at least one state detecting sensor, wherein the at least one state detecting sensor is designed to detect an obscured state of the vehicle sensor in which one of the distance measuring sensors is obscured by a part of the vehicle, wherein the controller is designed to control generation of the notification of the vehicle sensor obscured state using the device if the at least one state detecting sensor detects a vehicle sensor obscured state, wherein distance measurement of a parking bay is enabled using at least one non-obscured distance measuring sensor of the parking assistance system even if one or more distance measuring sensors included on a vehicle are in a vehicle sensor obscured state;

wherein the controller is further designed to utilize, at least in part, the distance measurement of the parking bay gathered while the vehicle sensor obscured state was detected, once the vehicle sensor obscured state is no longer detected.

10. The parking assistance system of claim 8, wherein the parking assistance system performs a process for avoiding a collision of a vehicle using the parking assistance system, an obscured state of the vehicle sensor, in which a distance measuring sensor of the parking assistance system is obscured by a part of the vehicle, is automatically detected, and a notification of the vehicle sensor obscured state is automatically generated if the vehicle sensor obscured state is present.

11. The method of claim 1, wherein detection of the vehicle sensor obscured state during a parking process leads to the parking process being assisted only if steering intervention is present or if a position of the vehicle from which the vehicle is parked into the parking bay is reached by reversing direction of the vehicle.

12. The method of claim 5, wherein detection of the vehicle sensor obscured state during a parking process leads to the parking process being assisted only if steering intervention is present or if a position of the vehicle from which the vehicle is parked into the parking bay is reached by reversing direction of the vehicle.

13. The system of claim 7, wherein detection of the vehicle sensor obscured state during a parking process leads to the parking process being assisted only if steering intervention is present or if a position of the vehicle from which the vehicle is parked into the parking bay is reached by reversing direction of the vehicle.

14. The system of claim 9, wherein detection of the vehicle sensor obscured state during a parking process leads to the parking process being assisted only if steering intervention is present or if a position of the vehicle from which the vehicle is parked into the parking bay is reached by reversing direction of the vehicle.

* * * * *